(12) United States Patent
Kim

(10) Patent No.: US 7,813,696 B2
(45) Date of Patent: Oct. 12, 2010

(54) BLUETOOTH REMOTE PTT AND HANDSFREE COMMUNICATION SYSTEM AND METHOD OF PROVIDING THE SAME

(75) Inventor: Sung Gon Kim, Seongnam-si (KR)

(73) Assignee: Seecode Co., Ltd., Seoul (KR)

( * ) Notice: Subject to any disclaimer, the term of this patent is extended or adjusted under 35 U.S.C. 154(b) by 915 days.

(21) Appl. No.: 11/650,812

(22) Filed: Jan. 8, 2007

(65) Prior Publication Data
US 2008/0125042 A1 May 29, 2008

(30) Foreign Application Priority Data
Nov. 29, 2006 (KR) .................. 10-2006-118972

(51) Int. Cl.
*H04B 7/00* (2006.01)
(52) U.S. Cl. ............... 455/41.2; 455/41.3; 455/517; 455/553.1
(58) Field of Classification Search ............... 455/41.2, 455/88, 413, 575.2, 41.3, 68, 517, 553.1
See application file for complete search history.

(56) References Cited

U.S. PATENT DOCUMENTS
2002/0082057 A1   6/2002  Kim
2004/0022395 A1   2/2004  Turnbull
2004/0122542 A1*  6/2004  Yang ........................... 700/94
2004/0198425 A1* 10/2004  Mellone et al. ........... 455/553.1
2008/0081667 A1*  4/2008  Parikh et al. ................ 455/558

FOREIGN PATENT DOCUMENTS
EP        1 443 665 A1      8/2004
KR        2002-0050531      6/2002
KR        10-2004-0013632   2/2004
WO        01/45282 A1       6/2001

* cited by examiner

*Primary Examiner*—Tuan H Nguyen
(74) *Attorney, Agent, or Firm*—Ladas and Parry LLP

(57) ABSTRACT

A Bluetooth remote PTT (Push-To-Talk) and handsfree communication system and a method of providing the same are disclosed. The Bluetooth remote PTT and handsfree communication system includes a dongle, connected to the handset transceiver or the CDMA terminal, for toggling a transmission mode and a reception mode in accordance with a key signal transmitted from a PTT key device. The dongle transmits an audio signal outputted from the handset transceiver to a headset in the reception mode, and receives a voice signal transmitted from the headset in the transmission mode to output the received voice signal to the handset transceiver. The headset receives and outputs the audio signal transmitted from the dongle, receives an input of user's voice, and transmits the user's voice signal to the dongle. The PTT key device transmits the key signal for toggling the transmission/reception mode according to a user's manipulation to the dongle. The dongle, the headset, and the PTT key device perform short-range wireless communications using Bluetooth.

7 Claims, 7 Drawing Sheets

BLUETOOTH REMOTE PTT AND HANDSFREE COMMUNICATION SYSTEM AND METHOD OF PROVIDING THE SAME

CROSS-REFERENCE TO RELATED APPLICATION

This application is based on and claims priority from Korean Patent Application No. 10-2006-0118972, filed on Nov. 29, 2006 in the Korean Intellectual Property Office, the disclosure of which is incorporated herein in its entirety by reference.

BACKGROUND OF THE INVENTION

1. Field of the Invention

The present invention relates to a Bluetooth remote PTT and handsfree communication system and a method of providing the same. More particularly, the present invention relates to a Bluetooth remote PTT and handsfree communication system and a method of providing the same, which can perform handsfree communications using a dongle, a headset, and a PTT (Push-To-Talk) key device for performing short-range wireless communications using Bluetooth.

2. Description of the Prior Art

Generally, various kinds of handset transceivers including TRS (Trunked Radio System) transceivers have been provided for wireless communications. A handset transceiver may be provided with a transceiver body on which a PTT key is installed and a wire headset on which a PTT key is installed for convenience in use.

In order to perform communications using various kinds of handset transceivers including TRS transceivers, a user presses the PTT key installed on the transceiver to transmit a voice signal, and releases the PTT key to receive an audio signal.

In the case of using a wire headset on which the PTT key is installed, a user should carry a somewhat heavy transceiver on a part of his/her body. The user presses the PTT key during the transmission operation, and releases the PTT key during the reception operation.

In order to perform the communications using the handset transceiver, the user should manipulate the PTT key, and this causes the user's free use of both hands to be limited. In the case of performing the communications using a wire headset, it is not required to hold the transceiver. However, a wire interface should be provided between the transceiver and the headset to cause the user inconvenience in use, and the user should manipulate the PTT key hanging on the wire headset or the transceiver in order to perform the communications, so that the user's other behaviors, in addition to the performing of the communications, are restricted.

For instance, in the case of performing the communications during movement by motorcycle or car, the user should continuously use one hand, and this may cause the user to be put to inconvenience and to get into danger.

In addition, the existing wire headset, on which the PTT key is hung, can be used only within the length of the wire, and is large-sized to cause the user inconvenience in carrying. Also, in the case of using the wire headset during driving a car, the user may be put in danger.

SUMMARY OF THE INVENTION

Accordingly, the present invention has been made to solve the above-mentioned problems occurring in the prior art, and an object of the present invention is to provide a handsfree communication system and a method of providing the same, which can remotely control PTT (Push-To-Talk) functions of various kinds of handset transceivers including a TRS transceiver using Bluetooth, and make it possible to perform communications through a Bluetooth wireless headset. Another object of the present invention is to provide a handsfree communication system, which is composed of a PTT key device, a wireless headset, and a dongle (that is a device for connecting the handset transceiver, the wireless headset, and the PTT key device), and a method of providing the same, which can improve inconvenience and risks in using the existing handset transceivers, and bring the effect of preventing accidents on the industrial spots where the handset transceivers are used and in special occupations including special deliveries by motorcycle and police guards.

In order to accomplish these objects, there is provided a Bluetooth remote PTT (Push-To-Talk) and handsfree communication system using a PTT type handset transceiver or a CDMA terminal, according to the present invention, which includes a dongle, connected to the handset transceiver or the CDMA terminal, for toggling a transmission mode and a reception mode in accordance with a key signal transmitted from a PTT key device, the dongle transmitting an audio signal outputted from the handset transceiver to a headset in the reception mode, and receiving a voice signal transmitted from the headset in the transmission mode to output the received voice signal to the handset transceiver; the headset for receiving and outputting the audio signal transmitted from the dongle, receiving an input of user's voice, and transmitting the user's voice signal to the dongle; and the PTT key device for transmitting the key signal for toggling the transmission/reception mode according to a user's manipulation to the dongle; wherein the dongle, the headset, and the PTT key device perform short-range wireless communications using Bluetooth.

In another aspect of the present invention, there is provided a method of providing a Bluetooth remote PTT (Push-To-Talk) and handsfree communication system using a dongle, connected to a PTT type handset transceiver or a CDMA terminal through a connection cable, for performing short-range wireless communications using Bluetooth, a headset and a PTT key device for performing short-range wireless communications using the dongle and the Bluetooth, which includes (a) the dongle searching for the headset and the PTT key device and connecting to the searched headset and PTT key device; (b) the dongle judging whether a key signal is transmitted from the PTT key device, setting a transmission mode if the key signal is transmitted, connecting an audio channel to the headset, receiving and outputting a voice signal transmitted form the headset to the handset transceiver; and (c) the dongle judging whether a ring tone is inputted from the handset transceiver, setting a reception mode if the ring tone is inputted, connecting an audio channel to the headset, and transmitting an audio signal inputted from the handset transceiver to the headset.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
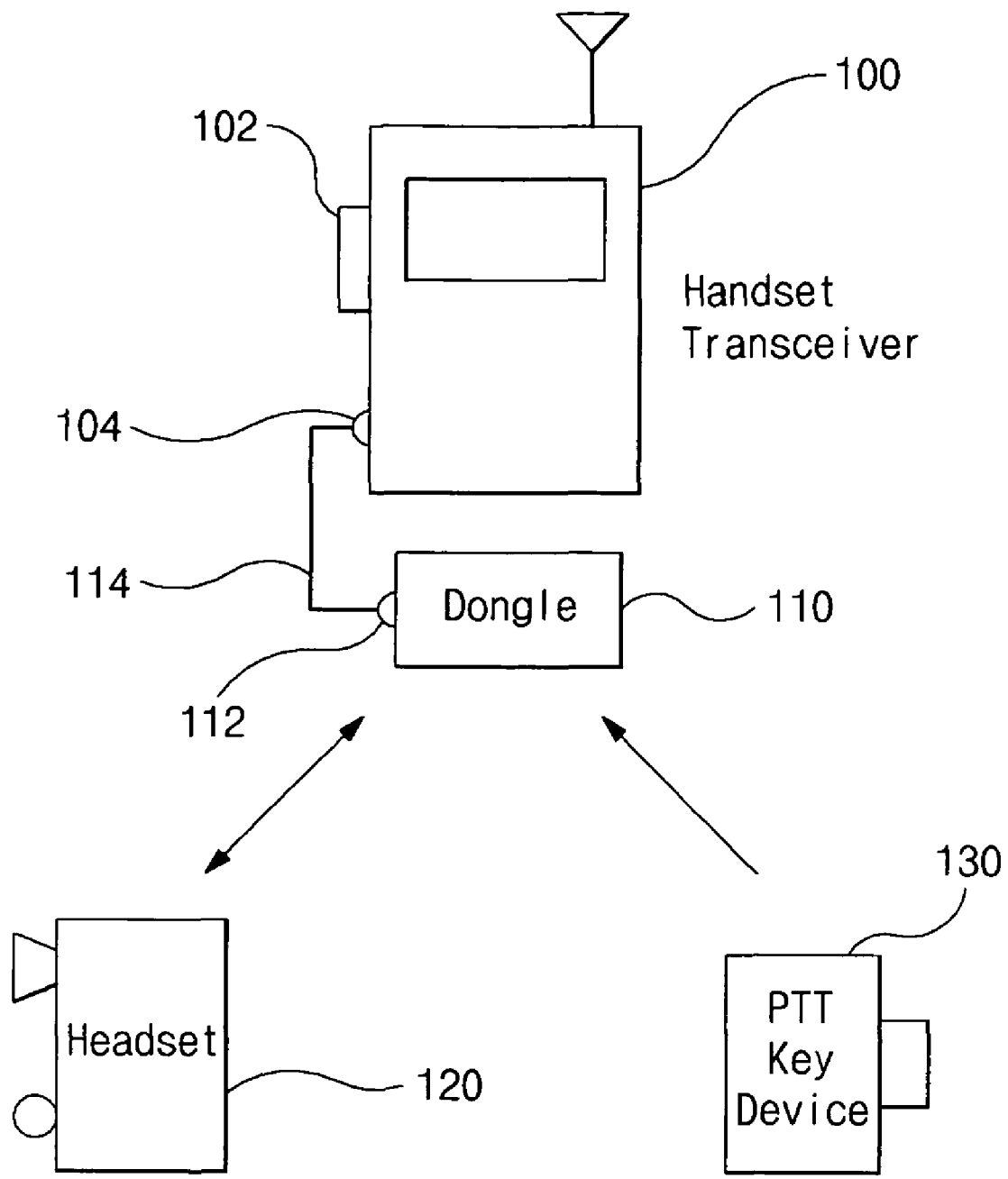
FIG. 1 is a schematic view illustrating the construction of a Bluetooth remote PTT and handsfree communication system according to an embodiment of the present invention.

FIG. 1 is a schematic view illustrating the construction of a Bluetooth remote PTT and handsfree communication system according to an embodiment of the present invention.

Referring to FIG. 1, the Bluetooth remote PTT (Push-To-Talk) and handsfree communication system according to an embodiment of the present invention includes a handset transceiver 100, a connection jack 114, a dongle 110, a headset 120, and a PTT key device 130.

The handset transceiver 100 for use in the Bluetooth remote PTT and handsfree communication system according to the present invention may be a TRS (Trunked Radio System) transceiver that operates in a PTT manner. The TRS transceiver is a transceiver that performs wireless communications using a trunked radio system. Unlike the existing cellular system such as a mobile phone that uses a dedicated channel frequency, the trunked radio system is a system that uses a pool of channels which are shared to a plurality of users to maximize the efficiency of frequency use. Accordingly, in the case of using 16 channels, the TRS can accommodate about 5,000 users, whereas the existing mobile phone can accommodate about 500 users only.

The PPT, which has been used for a long time in a two-way wireless transceiver that switches transmission/reception by performing FM, AM, or PM modulation using one frequency, is a transmission/reception switchover technique recently used by many wireless stations. For example, a user presses a PTT button during talking, and releases the PTT button during listening. By manipulating the PTT button attached to a side surface of the handset transceiver or TRS terminal, the user can perform one-to-one or one-to-many communications.

That is, a handset transceiver that performs wireless communications using the PTT may be used as the handset transceiver 100 according to the present invention. Preferably, a TRS transceiver using the PTT may be used as the handset transceiver 100 according to the present invention. Since such handset transceivers adopt the well-known conventional technology, the detailed explanation thereof will be omitted.

The connection jack 114 connects the handset transceiver 100 to the dongle 110, so that the dongle 110 can control the function of the handset transceiver 100, and serve to output user's voice or to receive an input of an audio signal received in the handset transceiver. Preferably, the connection jack 114 according to the present invention may comprise a four-pole plug. On terminal of the connection jack 114 is inserted into an external ear/jack port 104 of the handset transceiver 100, and the other terminal thereof is inserted into a connection port 112 of the dongle 110 according to the present invention, so that the dongle 110 is connected to the handset transceiver 100. It will be apparent to those skilled in the art that the connection jack 114 can be connected to diverse types of external ear/jack ports using corresponding genders.

The dongle 110, the headset 120, and the PTT key device 130 according to the present invention constitute a piconet using Bluetooth to perform short-range wireless communications.

Bluetooth is called a standard or a product that meets the standard requirement that makes two-way real-time communications possible between computers and mobile terminals or electronic appliances which are at short range and are wirelessly connected together. Bluetooth was first researched by Ericsson in Sweden in the year 1994, and became serious by Bluetooth SIG (Special Interest Group) organized by Ericsson, IMB Corporation, Intel Corporation, Nokia and Toshiba Corporation. In December, 2001, Microsoft, 3Com, Lucent Technologies and Motorola joined the Group of Bluetooth SIG, and thus Bluetooth is now called a short-range wireless communication rule which has settled down throughout the world and a product that meets such a rule.

According to one feature of Bluetooth, one master and six slaves constitute a piconet, and an ad-hoc communication network is constructed among the devices constituting the piconet. That is, seven devices are connected to one piconet, and one among the seven devices becomes a master that manages the piconet, such as generation of a frequency hopping pattern, while the remainders serve as slaves.

In the Bluetooth remote PTT and handsfree communication system according to the present invention, the dongle 110 serves as the master, and the headset 120 and the PTT key device 130 serve as the slaves.

Also, in the handsfree communication system according to the present invention, the dongle 110 and the headset 120 perform Bluetooth communications using a headset profile (HSP), and the dongle 110 and the PTT key device 130 perform Bluetooth communications using a serial port profile (SSP).

Here, the Bluetooth profiles define protocol arrangements for respective applications. That is, the profiles specify methods of mounting software stacks by application appliances to secure the interoperability among Bluetooth products from different manufacturers. In the profile, functions of Bluetooth layers and relations between such layers and applications have been defined. In Bluetooth version 1.0, 13 profile types have been defined, and operations for newly appropriating insufficient profiles have been steadily conducted by working groups.

In the present invention, wireless communications between the dongle 110 and the headset 120 are performed using the HSP that is the profile required to perform functions of the headset, handsfree phone, and wireless communication, and wireless communications between the dongle 110 and the PPT key device 130 are performed using the SSP that is the profile required to connect to an appliance (e.g., handset transceiver 100) having the existing serial port mounted thereon.

The dongle 110 is connected to the handset transceiver 100 using the connection jack 114 to implement the handsfree function of the handset transceiver 100, and performs short-range wireless communications with the headset 120 and the PTT key device 130. That is, the dongle 110 receives a key signal transmitted from the PTT key device 130, and controls the PTT function of the handset transceiver 100 (e.g., toggles a transmission mode and a reception mode). In the reception mode, the dongle 110 wirelessly transmits the audio signal outputted from the handset transceiver 100 to the headset 120, and in the transmission mode, the dongle 110 receives the voice signal transmitted from the headset 120 and outputs the received audio signal to the handset transceiver 100.

Figure 2:
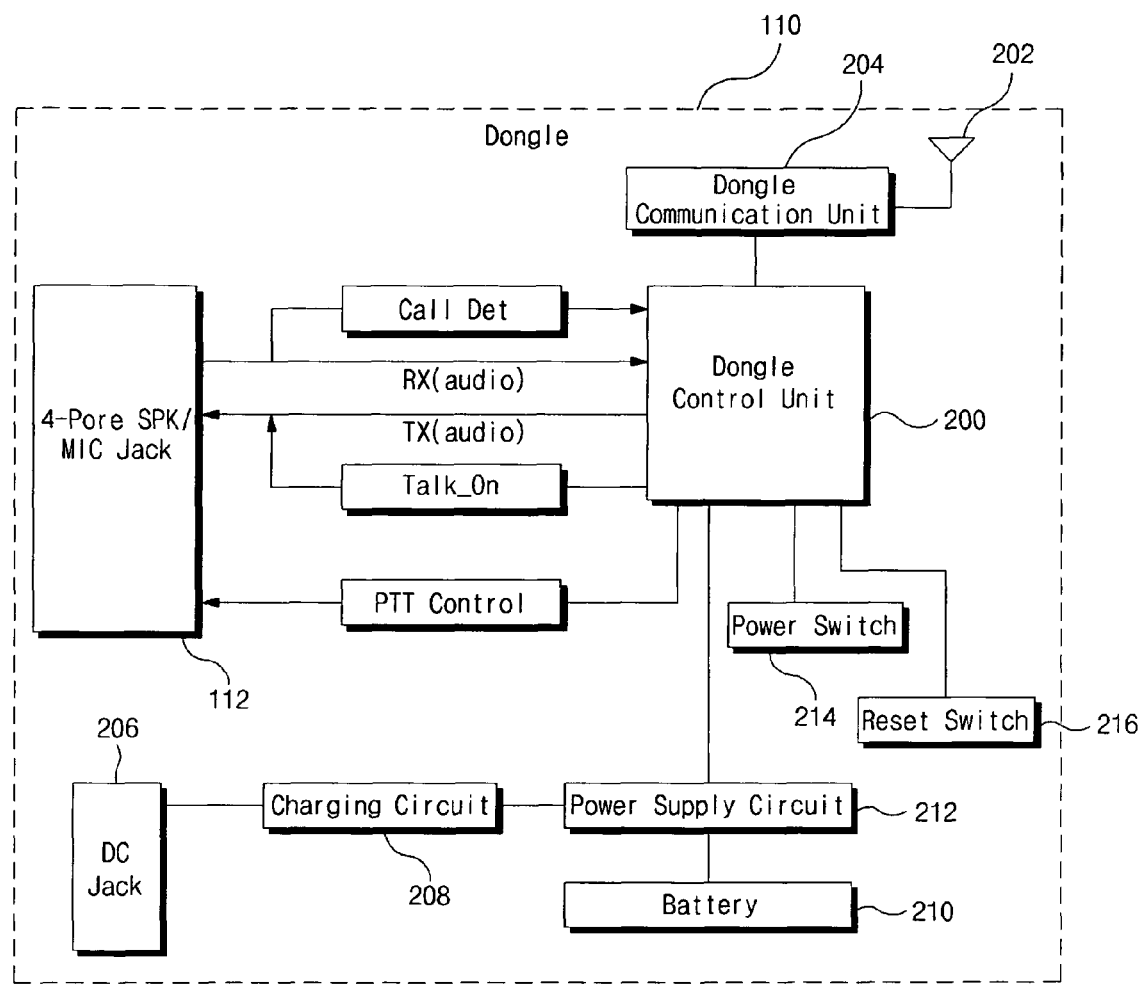
FIG. 2 is a block diagram illustrating the construction of a dongle according to an embodiment of the present invention.

FIG. 2 is a block diagram illustrating the construction of a dongle according to an embodiment of the present invention.

Referring to FIG. 2, the dongle 110 according to the present invention includes a dongle control unit 200, a Bluetooth antenna 202, a dongle communication unit 204, a connection port 112, a DC jack 206, a charging circuit 208, a battery 210, a power supply circuit 212, a power switch 214, and a reset switch 216.

One connection terminal of the connection jack 114 constructed as the four-pole plug as described above is inserted into the connection port 112, so that the connection port 112 is used as a data transmission/reception path between the dongle 110 and the transceiver 100. The power supply circuit 212 supplies the power to the respective constituent units of the dongle 110, and the DC jack 206, the charging circuit 208, and the battery 210 perform battery charging and power supply functions under the control of the power supply circuit 212. The power switch 214 serves to supply or intercept the power to the dongle 110, and the reset switch 216 serves to initialize the dongle in accordance with the user's manipulation. Since the constructions and functions of the DC jack 206, charging circuit 208, battery 210, power supply circuit 212, power switch 214, and reset switch 216 are well known in the art, the detailed explanation thereof will be omitted.

The Bluetooth antenna 202 is used as the data transmission/reception path when the dongle 110 performs short-range wireless communications with the headset 120 and the PTT key device 130.

The dongle communication unit 204 searches for the headset 120 and the PTT key device 130, and performs Bluetooth communications with the searched headset 120 using a headset profile (HSP). The dongle 110 and the searched PTT key device 130 perform Bluetooth communications using a serial port profile (SPP) or AV remote control profile (AVRCP). That is, the dongle communication unit 204 serves as a master of the Bluetooth network (i.e., piconet) that is composed of the dongle 110, the headset 120, and the PTT key device 130. The dongle communication unit 204 can be implemented using a Bluetooth chipset.

The dongle control unit 200 performs handsfree communications by controlling the constituent elements of the dongle, the handset transceiver 100, the PTT key device 130, and the headset 120. More specifically, the dongle control unit 200 receives the key signal transmitted from the PTT key device 130. If the PTT switch 304 is pressed, the PTT key device 130 transmits a press key signal, while if the PTT switch is not pressed, it transmits a release key signal. If the received key signal is the press key signal, the dongle control unit 200 turns on the PTT function of the handset transceiver 100 by setting a transmission mode, and receives the voice signal transmitted from the headset 120 to output the received voice signal to the handset transceiver 100.

In addition, the dongle control unit 200 according to the present invention judges whether the ring tone outputted from the handset transceiver 100 is received, and if the ring tone is inputted, it sets a reception mode, and transmits the audio signal outputted from the handset transceiver 100 to the headset 120. On the other hand, the dongle control unit 200 may judge whether the audio signal is inputted from the handset transceiver 100 without setting a separate ring tone, and if the audio signal is inputted, it may set a reception mode, so that the dongle 110 transmits the opposite party's audio signal, which has been received by the headset transceiver 100, to the headset 120.

It will be apparent to those skilled in the art that the Bluetooth antenna 202, the dongle communication unit 204, and the dongle control unit 200 can be implemented by a single chip.

The PTT key device 130 transmits a key signal for toggling the transmission/reception mode according to the user's manipulation to the dongle 110. That is, the PTT key device 130 according to the present invention, which is a slave constituting the Bluetooth network, controls the PTT function of the handset transceiver 100 by wirelessly transmitting the press key signal or the release key signal to the dongle 110 according to the user's manipulation.

Figure 3:
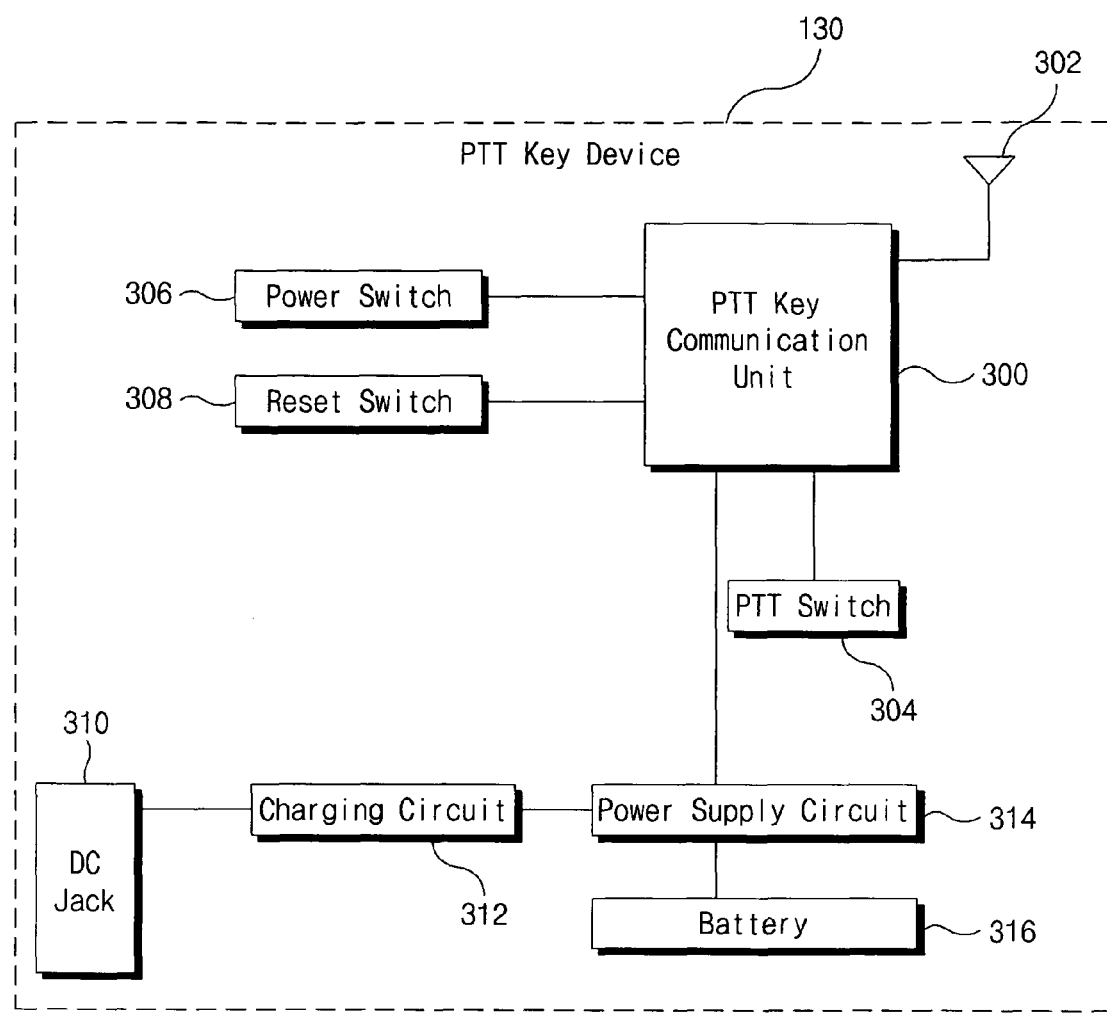
FIG. 3 is a block diagram illustrating the construction of a PTT key device according to an embodiment of the present invention.

FIG. 3 is a block diagram illustrating the construction of a PTT key device according to an embodiment of the present invention.

As shown in FIG. 3, the PTT key device 130 according to the present invention includes a PTT key communication unit 300, a Bluetooth antenna 302, a PTT switch 304, a power switch 306, a reset switch 308, a DC jack 310, a charging circuit 312, a power supply circuit 314, and a battery 316.

Here, since the constructions and functions of the Bluetooth antenna 302, DC jack 310, charging circuit 312, battery 316, power supply circuit 314, power switch 306, and reset switch 308 are the same as those constructed in the dongle 110, the detailed explanation thereof will be omitted.

The PTT switch 304 outputs key signals for setting or releasing the transmission mode according to the user's manipulation. Specifically, the PTT switch 304 according to the present invention comprises a press type button. If the user presses the PTT switch 304, it outputs the press signal, while if the user releases it, it outputs the release signal.

The PTT key communication unit 300 serves as a slave of the Bluetooth network, and performs Bluetooth wireless communications with the dongle using the serial port profile (SPP) or AV remote control profile (AVRCP). That is, the PTT key communication unit 300 according to the present invention transmits the press key signal to the dongle 110 if the PTT switch 304 is pressed, while it transmits the release key signal to the dongle 110 if the PTT switch 304 is released. Consequently, the PTT function of the handset transceiver 100 can be wirelessly controlled according to the user's manipulation of the PTT switch 304.

The PTT key device 130 according to the present invention may be coupled to a necklace so that the user can conveniently carry the device, or may be installed on a mount provided on a steering wheel of a vehicle or on a handle bar of a motorcycle.

The headset 120 receives and outputs the audio signal transmitted from the dongle 110, receives an input of user's voice, and transmits the user's voice signal to the dongle 110. That is, the headset 120 according to the present invention receives and outputs the opposite party's audio signal, which has been received by the headset transceiver 100, using the Bluetooth, and transmits the voice inputted by the user to an opposite party's handset transceiver (not illustrated) through the handset transceiver 100.

Figure 4:
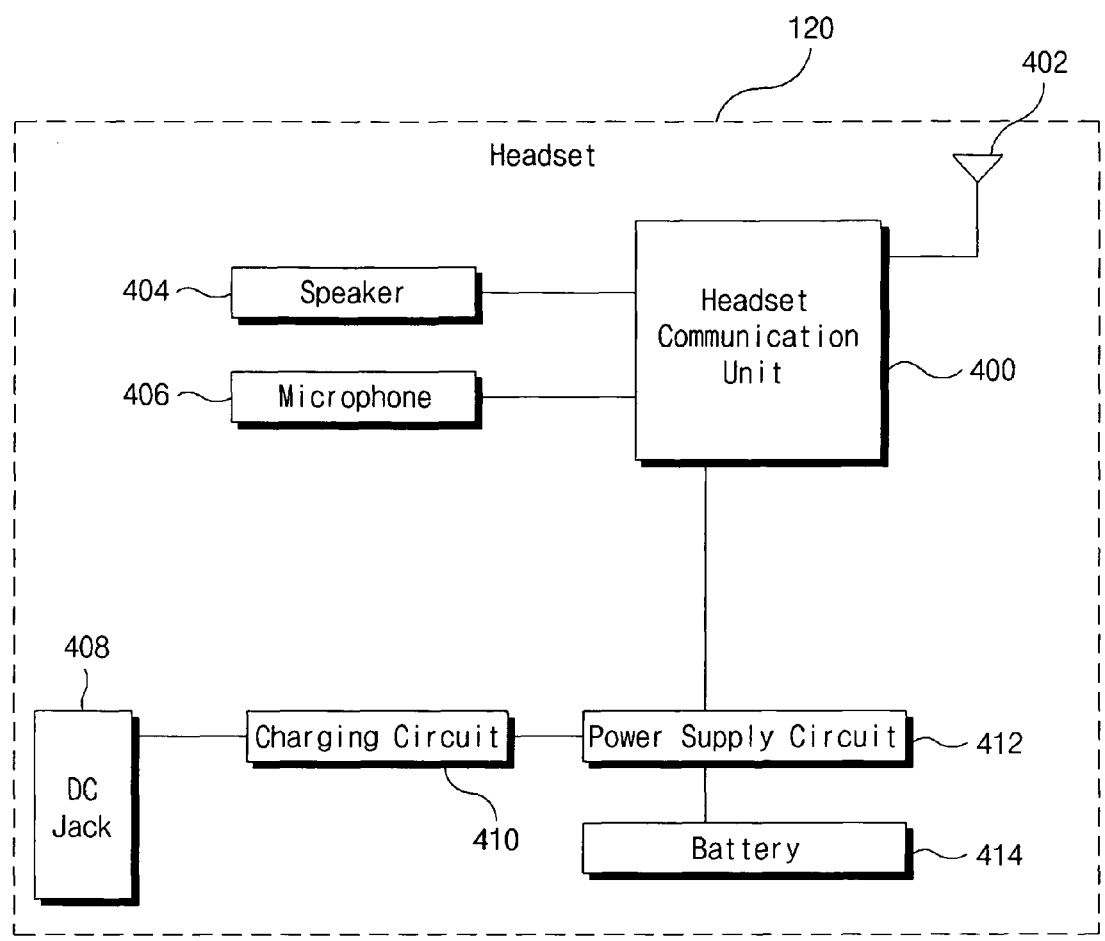
FIG. 4 is a block diagram illustrating the construction of a headset according to an embodiment of the present invention.

FIG. 4 is a block diagram illustrating the construction of a headset according to an embodiment of the present invention.

The headset 120 according to the present invention includes a headset communication unit 400, a Bluetooth antenna 402, a voice output unit 404, a voice input unit 406, a DC jack 408, a charging circuit 410, a battery 414, and a power supply circuit 412.

Here, since the constructions and functions of the Bluetooth antenna 402, DC jack 408, charging circuit 410, battery 414, and power supply circuit 412 are the same as those constructed in the dongle 110 or the PTT key device 130, the detailed explanation thereof will be omitted.

The voice input unit 406 receives and converts a user's voice signal into an electric signal to output the converted signal, and may typically comprise a microphone used in the headset. The voice output unit 404 outputs the opposite party's audio signal received through the headset communication unit 400, and may comprise a headphone, a speaker, an earphone, and so forth, which have been widely used.

The headset communication unit 400 performs Bluetooth communications with the dongle 110 using the headset profile (HSP), transmits the voice signal inputted from the voice input unit 406 to the dongle 110, and receives the audio signal transmitted from the dongle 110.

Hereinafter, the operation of the Bluetooth remote PTT and handsfree communication system as constructed above will be described with reference to the accompanying drawings.

Figure 5:
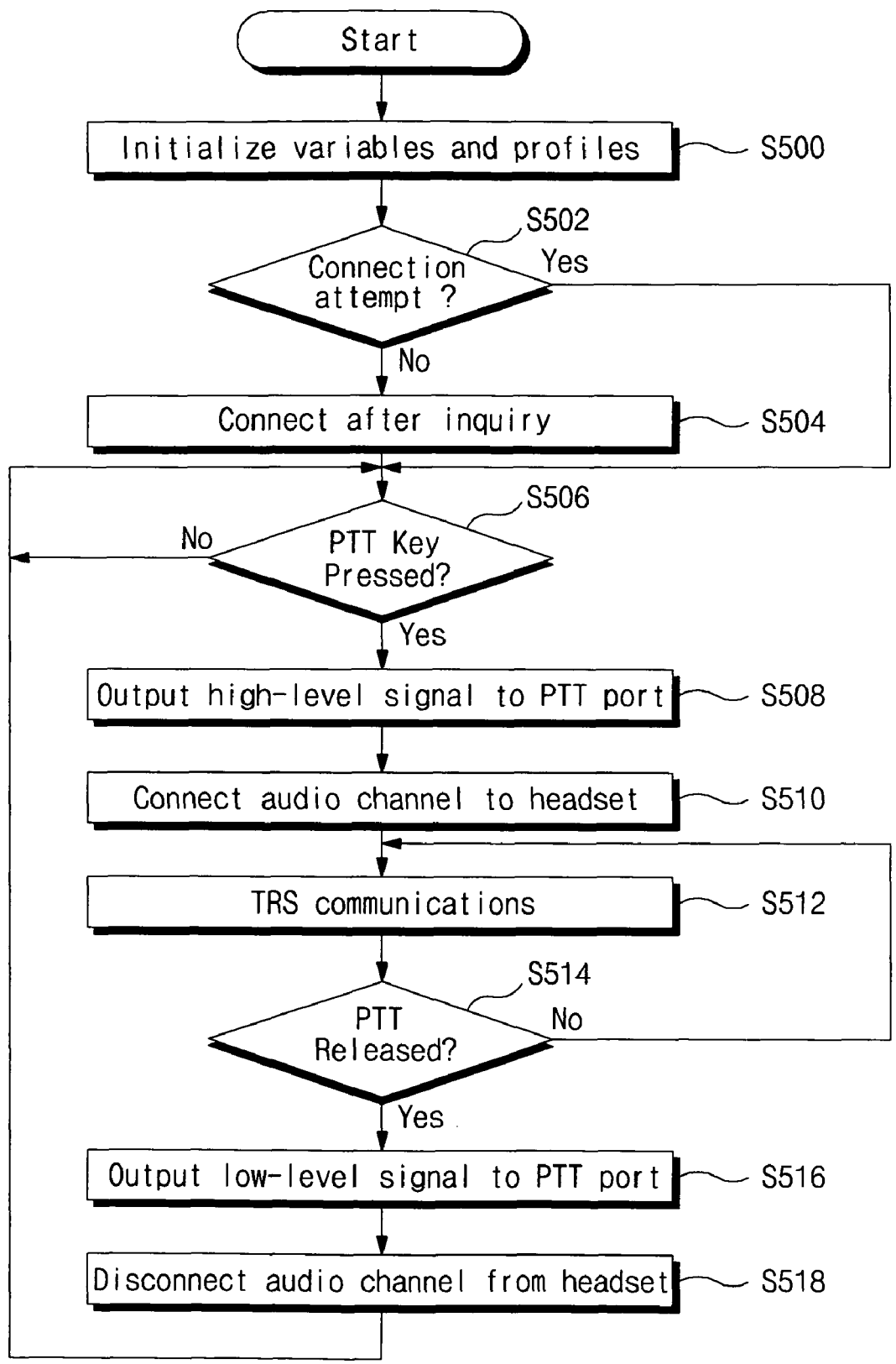
FIG. 5 is a flowchart illustrating a process of transmitting a voice signal according to an embodiment of the present invention.

FIG. 5 is a flowchart illustrating a process of transmitting a voice signal according to an embodiment of the present invention.

Referring to FIG. 5, if the power is supplied to the dongle 110 by the user, the dongle 110 initializes variables, HSP, and SPP or AVRCP (S500), and searches for the surrounding Bluetooth headset 120 and Bluetooth PTT key device 130 to attempt a connection thereto (S502). If the dongle 110 fails to connect to them, it attempts a reconnection thereto after making an inquiry (S504).

In this case, the dongle 110 is connected to the headset 120 through the HSP, and is connected to the PTT key device 130 through the SPP or AVRCP, so as to perform short-range wireless communications according to the corresponding profiles.

If the user presses the PTT switch 304 in order to perform one-to-one communications with various kinds of handset transceivers (not illustrated) including the opposite party's TRS transceiver after the dongle 110, two Bluetooth devices (e.g., headset 120 and PTT key device 130), the PTT key device 130 transmits the press key signal to the dongle 110.

After receiving the press key signal transmitted from the PTT key device 130 (S506), the dongle 110 activates the PTT of the handset transceiver 100 by making the PTT port of the handset transceiver 100 in a high-level state through the connection jack 114 (S508). Simultaneously, the dongle 110 connects the audio channel to the headset 120 using the HSP (S510).

If the user inputs the voice through the headset 120 in a state that the PTT function of the handset transceiver is activated, the headset 120 converts the user's voice into an electric signal, and transmits the converted signal to the dongle 110.

The dongle 110 receives the user's voice signal transmitted from the headset 120, and outputs the receive voice signal to the handset transceiver 100 through the connection jack 114 (S512). The handset transceiver 100 transmits the voice signal inputted through the connection jack 114 to the opposite party's transceiver.

If the user releases the PTT switch 304 provided in the PTT key device 130 to stop the voice transmission, the PTT key device 130 transmits the release key signal to the dongle 110.

The dongle 110 receives the release key signal transmitted from the PTT key device 130 (S514), inactivates the PTT of the connected handset transceiver 100 by making the PTT port in a low-level state (S516), and then terminates the voice transmission process by disconnecting the audio channel from the headset 120 (S518).

Figure 6:
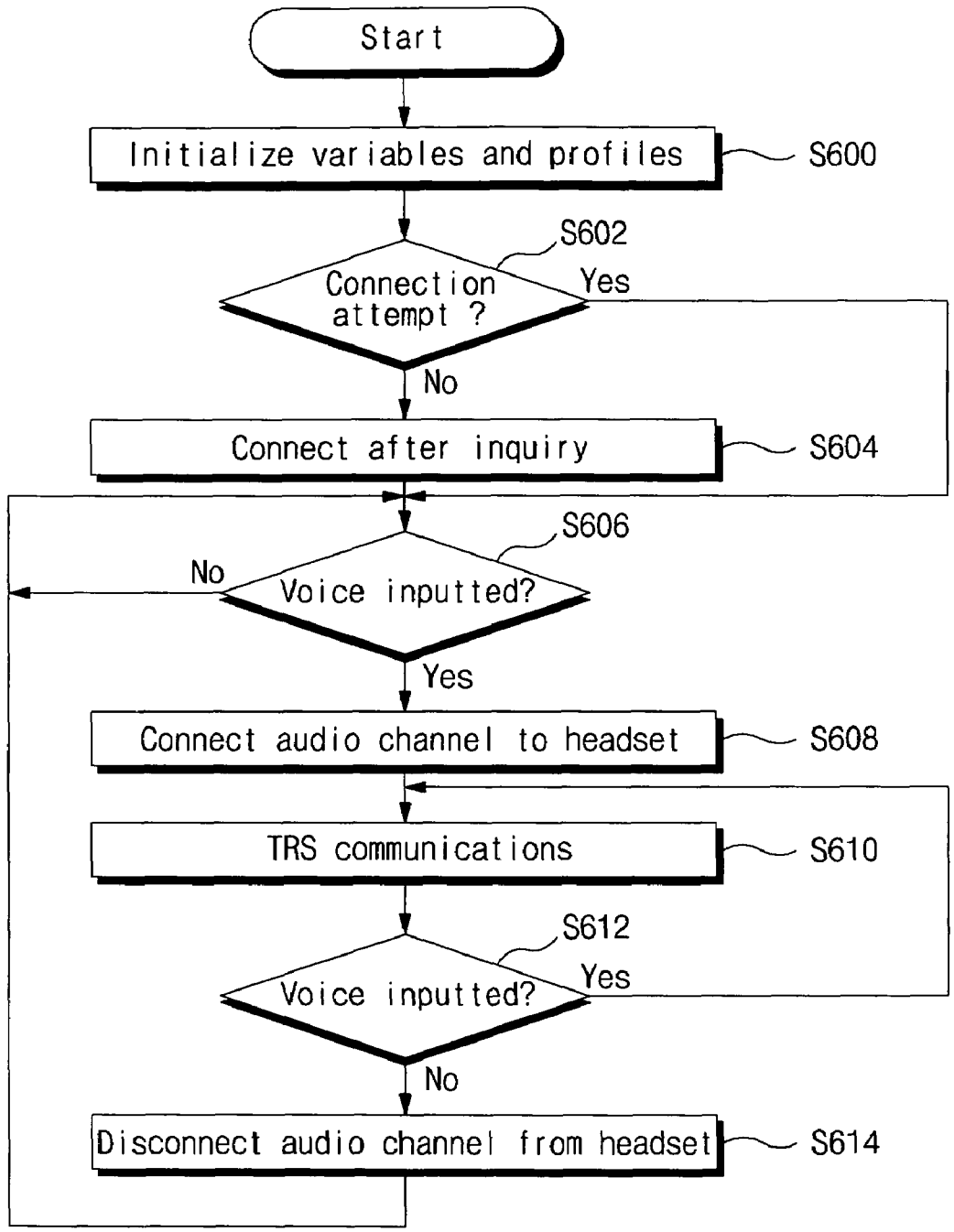
FIG. 6 is a flowchart illustrating a process of receiving a voice signal according to an embodiment of the present invention.

FIG. 6 is a flowchart illustrating a process of receiving a voice signal according to an embodiment of the present invention.

Referring to FIG. 6, if the power is supplied to the dongle 110 by the user, the dongle 110 initializes variables, HSP, and SPP or AVRCP (S600), and searches for the surrounding Bluetooth headset 120 and Bluetooth PTT key device 130 to attempt a connection thereto (S602). If the dongle 110 fails to connect to them, it attempts the reconnection thereto after making an inquiry (S604).

In this case, the dongle 110 is connected to the headset 120 through the HSP, and is connected to the PTT key device 130 through the SPP or AVRCP, so as to perform short-range wireless communications according to the corresponding profiles.

If an opposite party presses the PTT of the opposite party's handset transceiver and starts voice transmission, the handset transceiver 100 receives an initial ring tone and an audio signal transmitted from the opposite party's handset transceiver, and outputs the received ring tone and audio signal to the dongle 110 through the connection jack 114.

When the ring tone and the audio signal are inputted from the handset transceiver 100 (S606), the dongle 110 connects the audio channel to the headset 120 (S608), and transmits the input audio signal to the headset 120 (S610).

Simultaneously, the dongle 110 judges whether the audio signal is continuously inputted from the handset transceiver 100 (S612), and if the audio signal is not continuously inputted, it disconnects the audio channel from the headset 120, and terminates the voice reception process (S614).

Figure 7:
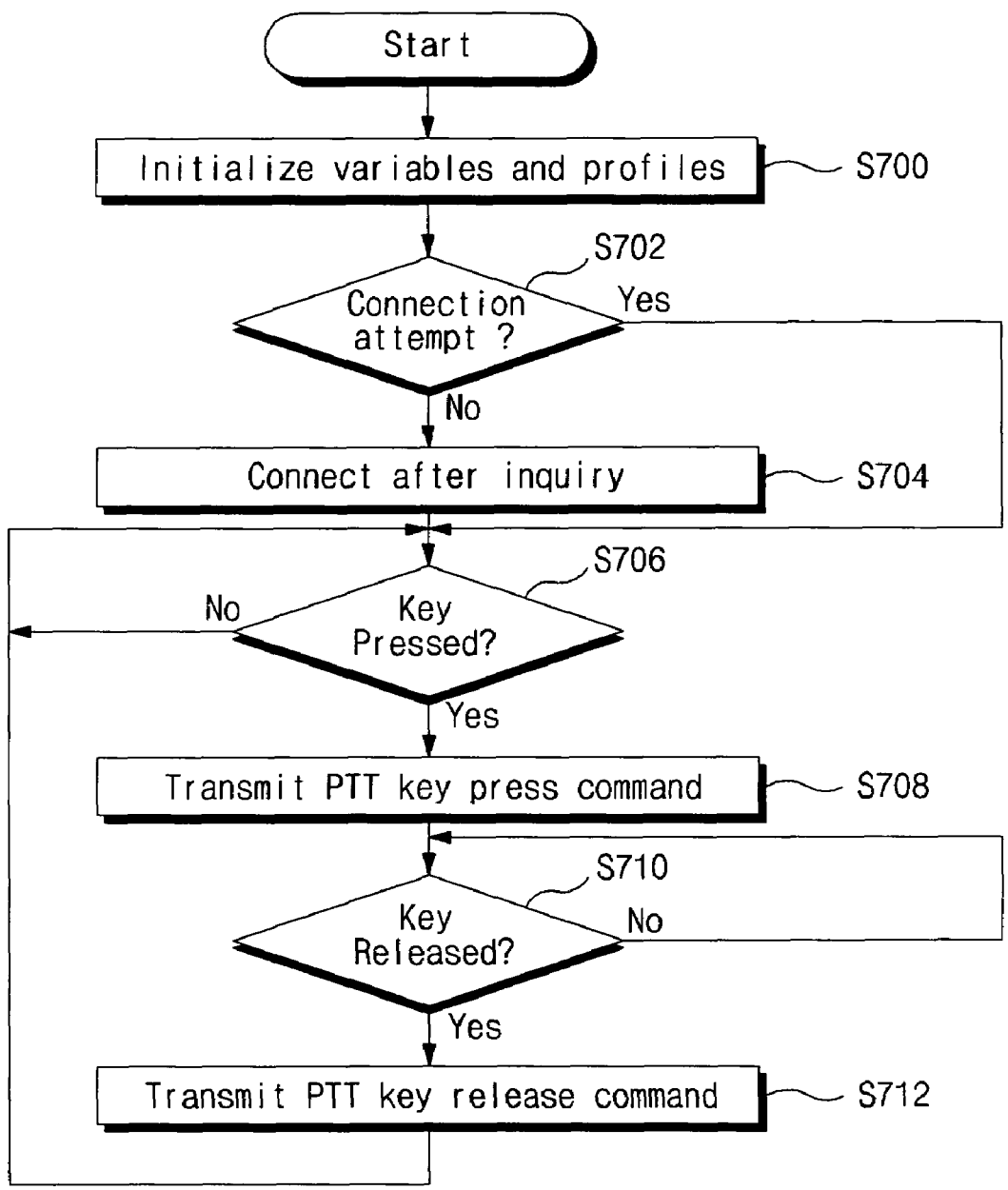
FIG. 7 is a flowchart illustrating an operation process of a PTT key device according to an embodiment of the present invention.

FIG. 7 is a flowchart illustrating an operation process of a PTT key device according to an embodiment of the present invention.

Referring to FIG. 7, if the power is supplied to the dongle 110 by the user, the dongle 110 initializes variables, HSP, and SPP or AVRCP (S700), and searches for the surrounding Bluetooth headset 120 and Bluetooth PTT key device 130 to attempt a connection thereto (S702). If the dongle 110 fails to connect to them, it attempts the reconnection thereto after making an inquiry (S704).

In this case, the dongle 110 is connected to the headset 120 through the HSP, and is connected to the PTT key device 130 through the SPP or AVRCP, so as to perform short-range wireless communications according to the corresponding profiles.

The PTT key device 130 detects whether the PTT switch 304 is pressed (S706), and if the PTT switch 304 is pressed, it transmits the press key signal to the dongle 110 (S708).

The PTT key device 130 judges whether the PTT switch 304, which has been pressed, is released (S710), and if the PTT switch 304 is released, it transmits the release key signal to the dongle 110 so as to terminate the voice transmission process (S712).

As described above, according to the Bluetooth remote PTT and handsfree communication system and the method of providing the same according to the present invention, since the PTT is wirelessly operated using the Bluetooth, the user can freely use both hands, and can freely communicate with an opposite party, even in a state that the user does not carry any handset transceiver including a TRS transceiver, within 100 m that is the arrival distance of the Bluetooth.

In addition, since the PTT key device is separately provided, great convenience and simplicity can be given with the safety heightened in environments where various kinds of handset transceivers are used, for example, on the industrial spots and in special occupations including special deliveries by motorcycle, leisure coteries, police guards, and so forth.

In addition, the present invention can be applied to handset transceiver markets, in which handset transceivers for living, industry, and special purposes are in steady demand throughout the world, and PTT mobile phone markets, in which large mobile communication providers have introduced PPT services for using mobile phones as handset transceivers, with its utility and commercial value greatly heightened.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A Bluetooth remote PTT (Push-To-Talk) and handsfree communication system using a PTT type handset transceiver or a CDMA terminal, the communication system comprising:
    a dongle, connected to the handset transceiver or the CDMA terminal, for toggling a transmission mode and a reception mode in accordance with a key signal transmitted from a PTT key device, the dongle transmitting an audio signal outputted from the handset transceiver to a headset in the reception mode, and receiving a voice signal transmitted from the headset in the transmission mode to output the received voice signal to the handset transceiver;
    the headset for receiving and outputting the audio signal transmitted from the dongle, receiving an input of user's voice, and transmitting the user's voice signal to the dongle; and
    the PTT key device for transmitting the key signal for toggling the transmission/reception mode according to a user's manipulation to the dongle;
    wherein the dongle, the headset, and the PTT key device perform short-range wireless communications using Bluetooth,
    wherein the dongle comprises:
    a Bluetooth antenna for performing short-range wireless communications with the headset and the PTT key device;
    a dongle communication unit for searching for the headset and the PTT key device, performing Bluetooth communications with the searched headset using a headset profile (HSP), and performing Bluetooth communications with the searched PTT key device using a serial port profile (SPP); and
    a dongle control unit for judging whether the key signal transmitted from the PTT key device is received, and if a press key signal is inputted, setting the transmission mode to turn on a PTT function of the handset transceiver, and receiving the voice signal transmitted from the headset to output the received voice signal to the handset transceiver, the dongle control unit judging whether a ring tone outputted from the handset transceiver is inputted, and if the ring tone is inputted, setting the reception mode and transmitting the audio signal outputted from the handset transceiver to the headset.

2. The communication system of claim 1, wherein the dongle and the headset perform Bluetooth communications using a headset profile (HSP), and the dongle and the PTT key device perform Bluetooth communications using a serial port profile (SSP).

3. The communication system of claim 1, wherein the PTT key device comprises:
    a Bluetooth antenna for performing short-range wireless communications with the dongle;
    a PTT switch for outputting key signals for setting or releasing the transmission mode according to the user's manipulation; and
    a PTT key communication unit for performing Bluetooth wireless communications with the dongle using a serial port profile (SPP), transmitting a press key signal to the dongle if the PTT switch is pressed, and transmitting a release key signal to the dongle if the PTT switch is released.

4. The communication system of claim 1, wherein the headset comprises:
    a voice input unit for receiving the user's voice signal and converting the voice signal into an electric signal to output the converted signal;
    a headset communication unit for performing Bluetooth communications with the dongle using a headset profile (HSP), transmitting the voice signal inputted from the voice input unit to the dongle, and receiving the audio signal transmitted from the dongle; and
    a voice output unit for outputting the audio signal received through the Bluetooth communication unit.

5. A method of providing a Bluetooth remote PTT (Push-To-Talk) and handsfree communication system using a dongle, connected to a PTT type handset transceiver or a CDMA terminal through a connection cable, for performing short-range wireless communications using Bluetooth, a headset and a PTT key device for performing short-range wireless communications with the dongle using the Bluetooth, the method comprising:
    (a) searching by the dongle for the headset and the PTT key device and connecting to the searched headset and PTT key device;
    (b) judging by the dongle whether a key signal is transmitted from the PTT key device, and if the key signal is transmitted, setting a transmission mode, connecting an audio channel to the headset, receiving a voice signal transmitted form the headset and outputting the voice signal to the handset transceiver; and
    (c) judging by the dongle whether a ring tone is inputted from the handset transceiver, and if the ring tone is inputted, setting a reception mode, connecting an audio channel to the headset, and transmitting an audio signal inputted from the handset transceiver to the headset,
    wherein the step (a) comprises:
    (a1) initializing by the dongle variables, a headset profile (HSP), and a serial port profile (SPP);
    (a2) attempting by the dongle to connect to the headset and the PTT key device; and
    (a3) if the connection fails at step (a2), attempting by the dongle reconnection after making an inquiry.

6. The method of claim 5, wherein the step (b) comprises:
    (b1) judging by the dongle judging whether the key signal (a PTT key press signal) transmitted from the PTT key device is received, and if the PTT key press signal is received, outputting a high-level signal to a PTT port of the handset transceiver;
    (b2) connecting by the dongle the audio channel to the headset;
    (b3) receiving by the dongle the voice signal transmitted from the headset and outputting the received voice signal to the handset transceiver;
    (b4) judging by the dongle whether the key signal (a PTT key release signal) transmitted from the PTT key device is received, and if the PTT key release signal is received, outputting a low-level signal to the PPT port of the handset transceiver; and (b5) disconnecting by the dongle the audio channel from the headset.

7. The method of claim 5, wherein the step (c) comprises:
(c1) judging by the dongle whether the ring tone is inputted from the handset transceiver;
(c2) if the ring tone is inputted at the step (c1), connecting by the dongle the audio channel to the headset;
(c3) transmitting by the dongle the audio signal inputted from the handset transceiver to the headset; and
(c4) judging by the dongle whether the audio signal is inputted from the handset transceiver, and if the audio signal is not inputted, disconnecting the audio channel from the headset.

\* \* \* \* \*